Patented Oct. 20, 1942

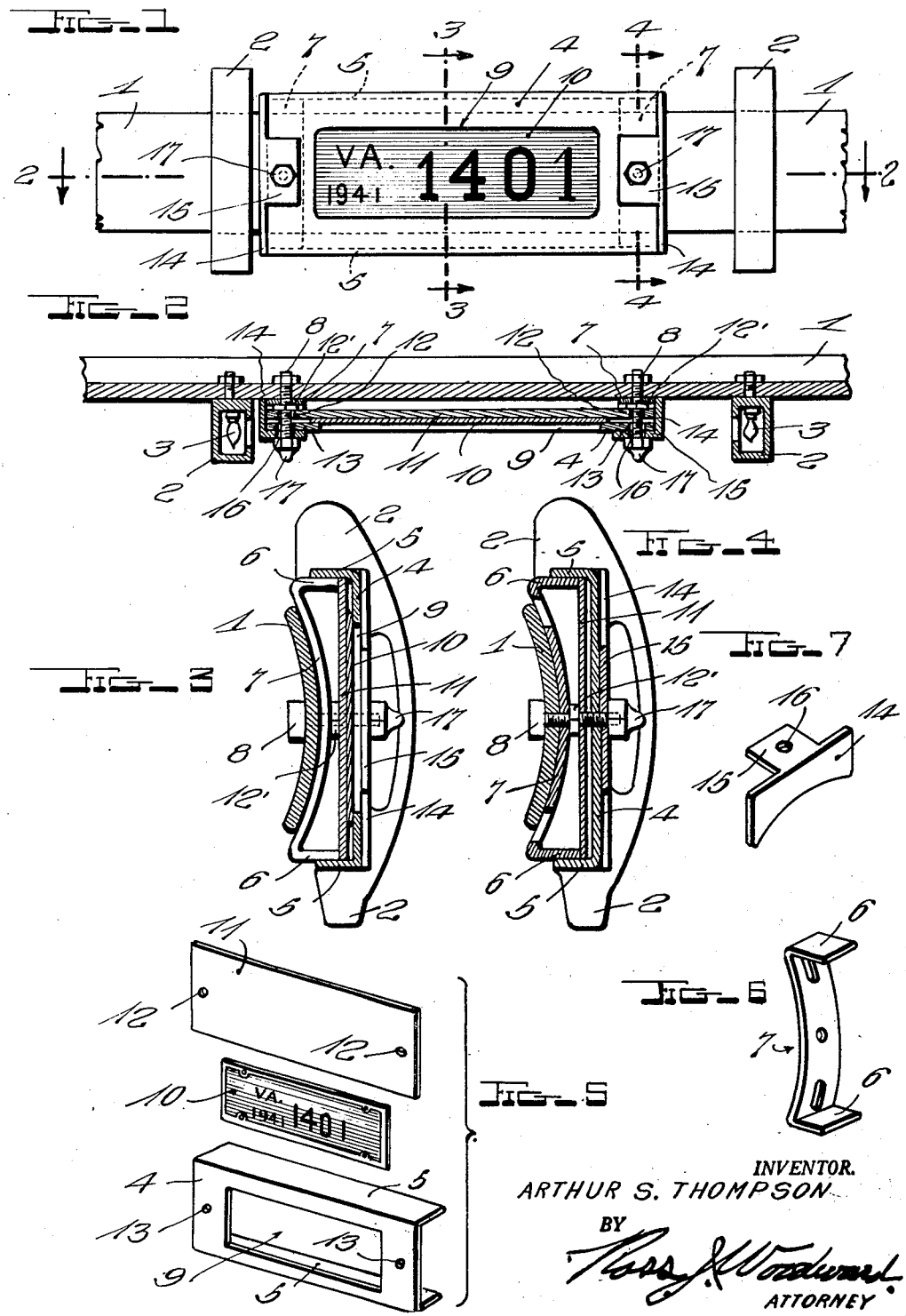

2,299,359

UNITED STATES PATENT OFFICE 2,299,359

BUMPER AND LICENSE PLATEHOLDER

Arthur S. Thompson, Ontario, Calif.

Application May 26, 1941, Serial No. 395,271

7 Claims. (Cl. 40—125)

This invention relates to a license plate holder associated with the bumper of an automobile or other motor vehicle and it is one object of the invention to provide a device of this character so constructed that it may be applied to the bumper bar between vertical guards carried thereby where it will be protected by the guards and may be illuminated by lights carried by the guards.

Another object of the invention is to provide a license plate holder having a casing or license plate holder which is easily assembled and so constructed that the license plate mounted therein will be firmly held in place and may be clearly seen.

Another object of the invention is to provide the casing with end members serving to reinforce the same and also serving as abutment means for a backing plate against which the license plate is held when the casing or cover is applied and secured.

Another object of the invention is to provide a license plate holder which may be formed of sheet metal and thus cheaply manufactured and sold at a low cost.

In the accompanying drawing:

Fig. 1 is a front view showing the improved license plate holder mounted on a bumper.

Fig. 2 is a sectional view taken horizontally on the line 2—2 of Fig. 1.

Fig. 3 is a vertical sectional view on the line 3—3 of Fig. 1.

Fig. 4 is a sectional view taken vertically through one end of the holder, on the line 4—4 of Fig. 1.

Fig. 5 is a perspective view showing the casing, the backing plate and the license plate in a group.

Fig. 6 is a perspective view of one of the brackets against which the backing plate rests or bears.

Fig. 7 is a perspective view of an end member of the casing.

This improved license plate holder is for use upon automobiles and other motor vehicles and, when in use, is applied to a bumper 1 which may be either a rear or front bumper. The bumper 1 is of a conventional bar formation and carries vertically disposed guards 2 which project above and below the bumper 1 and may be equipped with electric bulbs or equivalent lamps 3, so that light will be directed upon the license plate holder carried by the bumper between the guards.

The license plate holder has a casing or frame 4 formed of sheet metal and having marginal portions bent to provide upper and lower walls or flanges 5 for overlapping the arms 6 of a pair of yokes 7. These yokes are formed of stiff metal and are curved longitudinally to conform to the curvature of the bumper bar 1 to which they are applied and secured by bolts 8. It will be understood that the yokes or brackets 7 may be flat instead of curved if they are intended to be applied to a flat bumper bar. A large opening 9 is formed in the frame or casing 4 and, since the opening extends the major portion of the length and width of the casing, it will constitute a sight opening through which the license plate 10 may be clearly observed. A plate 11 serves as a backing for the license plate and this backing plate is formed, near its ends, with openings 12 to receive the bolts 8. Nuts 12', for holding the bolts 8 in place, are applied and tightened to secure the bolts in fixed position and, when the backing plate is set in place, it bears against these nuts and also against ends of the arms 6 of the yokes or brackets 7. The license plate is then set in position against the backing plate and the casing 4 applied, with the bolts passing through openings 13 formed near ends of the casing. End plates or closures 14 are then set in place against ends of the casing with their tongues 15 overlapping ends of the casing and the bolts 8 passing through openings 16 formed in the tongues, after which cap nuts 17 are applied to the protruding ends of the bolts and tightened to hold the end plates and the casing in place. The license plate holder will thus be held assembled with the license plate in position between the casing or cover and the backing plate and exposed through the sight opening 9 of the casing.

When it is desired to substitute new plates instead of those mounted in holders carried by the bumpers of an automobile, it is merely necessary to remove the cap nuts, lift the casing and the end plates out of place, substitute a new license plate in lieu of an old one, and then replace the casing and the end plates and reapply the cap nuts.

Having thus described the invention, what is claimed is:

1. A license plate holder comprising brackets adapted to be mounted against a bumper bar, said brackets being provided with arms, a plate disposed against the arms of said brackets and constituting a backing for a license plate, a cover for the license plate formed with a sight opening and provided with upper and lower flanges extending across edges of the backing plate and along arms of the brackets, end plates having tongues for overlapping end portions of said cover, and fasteners for securing the brackets to a bumper bar and holding the backing plate against the arms of the brackets and the cover and the end plates assembled.

2. A license plate holder comprising a frame formed with a display opening and having upper and lower flanges, a backing plate in said frame for holding a license plate in position for display through the sight opening, brackets for fitting against a bumper bar having arms overlapped by the flanges of the frame and abutting the backing plate, end plates for closing ends of the frame formed with tongues overlapping end portions of the frame, and bolts for securing the brackets against a bumper bar and passing through alined openings in the backing plate and end portions of said frame and the tongues of the end plates to hold the backing plate and the frame and the end plates assembled with a license plate gripped and held in place between the backing plate and frame.

3. A license plate holder comprising brackets for fitting against a bumper bar, bolts for passing through the bumper bar and brackets, nuts carried by said bolts for firmly securing the brackets against the bumper bar, a frame formed with a display opening and having marginal flanges for overlapping said brackets, a backing plate in the frame between the flanges thereof for holding a license plate against the inner face of the frame in position for display through the opening of the frame, the backing plate and frame being formed with openings through which said bolts pass, end plates for the frame having tongues overlapping end portions of the frame and formed with openings through which the bolts pass, and fasteners threaded on the protruding ends of the bolts and when tightened firmly holding the tongues against the outer face of the frame and exerting pressure to clamp a license plate between the frame and the backing plate and hold the backing plate firmly against the brackets.

4. A license plate holder comprising a frame formed with a display opening, a backing plate fitting within the frame for holding a license plate in position for display through the opening, brackets for fitting against a bumper bar having portions extending into the frame for engagement with the backing plate, and fasteners for securing the brackets to the bumper bar having portions extending forwardly from the brackets for passing through the frame and backing plate and detachably holding the same in assembled relation to the brackets and each other.

5. A license plate holder comprising a frame formed with a display opening, end walls for the frame having extensions overlapping end portions of the frame, a backing plate for holding a license plate in the frame in position for display through the opening, brackets for fitting against a bumper bar having portions extending into the frame for abutting engagement with the backing plate, and fasteners for securing the brackets to the bumper bar and passing through the backing plate and frame and the extensions of the end walls to hold the same assembled.

6. A license plate holder comprising a frame formed with a display opening, a backing plate for a license plate removably received in the frame, brackets for fitting against a bumper bar, and bolts for firmly securing the brackets against the bumper bar, said bolts being of a length adapting them to pass through the frame and the backing plate and detachably hold the frame and backing plate assembled and in place against the brackets.

7. A license plate holder comprising a frame formed with a display opening, a backing plate for a license plate removably received in the frame, brackets for fitting against a bumper bar, bolts for passing through a bumper bar and the brackets and through the backing plate and frame, nuts carried by the bolts for holding the brackets firmly against the bumper bar, and cap nuts threaded on ends of the bolts to detachably hold the frame and the backing plate in place with a license plate gripped between them in position for display through the opening in the frame.

ARTHUR S. THOMPSON.